(12) United States Patent
Kobayashi et al.

(10) Patent No.: US 6,440,323 B1
(45) Date of Patent: Aug. 27, 2002

(54) MN-ZN FERRITE AND PRODUCTION PROCESS THEREOF

(75) Inventors: Osamu Kobayashi; Osamu Yamada; Kiyoshi Ito, all of Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 27 days.

(21) Appl. No.: 09/690,902

(22) Filed: Oct. 18, 2000

(30) Foreign Application Priority Data

Nov. 19, 1999 (JP) ............................................. 11-329937

(51) Int. Cl.$^7$ .............................. B22F 1/00; C04B 35/26
(52) U.S. Cl. ................. 252/62.62; 252/62.6; 252/62.59
(58) Field of Search .............................. 252/62.6, 62.59, 252/62.62

(56) References Cited

U.S. PATENT DOCUMENTS

| | | | |
|---|---|---|---|
| 3,674,694 A | * 7/1972 | Stadler et al. | 252/62.59 |
| 4,808,327 A | 2/1989 | Rousset et al. | 252/62.56 |
| 5,593,612 A | 1/1997 | Lubitz | 252/62.56 |
| 6,180,022 B1 | * 1/2001 | Kobayashi et al. | 252/62.53 |
| 6,210,598 B1 | * 4/2001 | Kobayashi et al. | 252/62.62 |
| 6,296,791 B1 | * 10/2001 | Kobayashi et al. | 252/62.56 |

FOREIGN PATENT DOCUMENTS

| | | |
|---|---|---|
| EP | 0 844 220 | 5/1998 |
| EP | 0 951 024 | 10/1999 |
| GB | 2001950 | * 2/1979 |
| JP | 11-29993 | 2/1999 |

OTHER PUBLICATIONS

Bhise, B. V. et al., "Role of MnTi and MnSn Substitutions on the Electrical Properties of Ni–Zn Ferrites," Physica Status Solida (A). Applied Research, DE, Berlin, vol. 157, No. 2, pp. 411–419, 1996, No month.

* cited by examiner

*Primary Examiner*—C. Melissa Koslow
(74) *Attorney, Agent, or Firm*—Oliff & Berridge PLC

(57) ABSTRACT

This invention provides a Mn—Zn ferrite which has a high electrical resistance and can sufficiently satisfy the use in a high frequency region exceeding 1 MHz. This invention further provides a production process of the Mn—Zn ferrite in which mixed powder whose components are adjusted so as to have a basic component composition containing 44.0 to 50.0 mol% $Fe_2O_3$, 4.0 to 26.5 mol % ZnO, 0.1 to 8.0 mol % one or two from $TiO_2$ and $SnO_2$ and the remainder consisting of MnO, and further to contain 0.01 to 2.00 mass % one or more of CoO, NiO, and MgO as additive is pressed, then sintered and cooled in the air or in an atmosphere containing some amount of oxygen.

12 Claims, No Drawings

MN-ZN FERRITE AND PRODUCTION PROCESS THEREOF

BACKGROUND OF THE INVENTION

1. Field of the Invention

The present invention relates to an oxide magnetic material having soft magnetism, particularly to a Mn—Zn ferrite and more particularly to a Mn—Zn ferrite suitable for use as a high permeability material used for various inductance elements, impedance elements for EMI countermeasure or the like, a low loss material used for switching power transformers, an electromagnetic wave absorbing material and the like, and a production process thereof.

2. Description of the Related Art

A Mn—Zn ferrite is counted among the typical oxide magnetic materials having soft magnetism. The Mn—Zn ferrite of the prior art usually has a basic component composition containing more than 50 mol % (52 to 55 mol % on the average) $Fe_2O_3$, 10 to 24 mol % ZnO and the remainder consisting of MnO. And the Mn—Zn ferrite is usually produced by mixing the respective material powders of $Fe_2O_3$, ZnO and MnO in a prescribed ratio, subjecting to the respective steps of calcination, milling, component adjustment, granulation, pressing and the like to obtain a desired shape, then conducting sintering treatment in which the resulting product is kept at 1200 to 1400° C. for 3 to 4 hours in a reducing atmosphere in which a partial pressure of oxygen is limited to a low level by supplying nitrogen. Incidentally, the reason why the Mn—Zn ferrite is sintered in the reducing atmosphere is that when it contains $Fe_2O_3$ exceeding 50 mol % and is sintered in the air, densification is not attained sufficiently thereby failing to obtain excellent soft magnetism, and that although $Fe^{2+}$ formed by the reduction of $Fe^{3+}$ has positive crystal magnetic anisotropy and cancels negative crystal magnetic anisotropy of $Fe^{3+}$ thereby enhancing soft magnetism, such a reducing reaction cannot be expected if sintering is conducted in the air.

Incidentally, it has been known that the above-mentioned densification depends on the partial pressure of oxygen in the temperature rise at the time of sintering and the above mentioned formation of $Fe^{2+}$ depends on the oxygen in the temperature fall after sintering, respectively. Therefore, when the setting of the partial pressure of oxygen at the time of sintering is wrong, it becomes difficult to ensure an excellent soft magnetism. Thus, in the prior art, the following expression (1) was experimentally established and the partial pressure of oxygen at the time of sintering has been conventionally controlled strictly in accordance with this expression (1).

$$\log PO_2 = -14540/(T+273)+b \quad (1)$$

where T is temperature (°C.), $PO_2$ is a relative partial pressure of oxygen, wherein $PO_2 = P'O_2/P_{total}$, $P'O_2$ is the absolute partial pressure of oxygen (Pa), and $P_{total}$ is the absolute total pressure (Pa), and b is a constant. The constant b has been set at about 7 to 8. The fact that the constant b is set at 7 to 8 means that the partial pressure of oxygen during sintering must be controlled at a narrow range, which makes the sintering treatment very troublesome thereby increasing the production costs.

On the other hand, when the Mn—Zn ferrite is used as a magnetic core material, eddy current flows at a higher frequency region, resulting in a larger loss. Therefore, to extend an upper limit of the frequency at which the Mn—Zn ferrite can be used as a magnetic core material, its electrical resistance must be set as high as possible. However, the electrical resistance in the above-mentioned usual Mn—Zn ferrite has values smaller than 1 Ωm due to the transfer of electrons between the above-mentioned $Fe^{3+}$ ions and $Fe^{2+}$ ions and a frequency which is available for application is limited to about several hundred kHz maximum. Thus, in a frequency region exceeding this limit, permeability (initial permeability) is remarkably lowered and the properties of the soft magnetic material are lost.

SUMMARY OF THE INVENTION

The present invention has been made in consideration of the above-mentioned conventional problems. The present invention has objects to provide a Mn—Zn ferrite which has a high electrical resistance and can sufficiently satisfy applications in a high frequency region exceeding 1 MHz, and to provide a production process thereof in which such Mn—Zn ferrite can be obtained easily and at low costs.

The present inventors recognized in a series of researches related to the Mn—Zn ferrite that even if $Fe_2O_3$ content is limited to 50.0 mol % or less, the Mn—Zn ferrite has a high electrical resistance by allowing suitable amounts of $TiO_2$ and/or $SnO_2$ to be contained and further a suitable amount of CuO to be contained as desired and can sufficiently satisfy applications in a high frequency region exceeding 1 MHz, and have already disclosed the above in Japanese Patent Application No. Hei 11-29993 and Japanese Patent Application No. Hei 11-29994 (both applications are unpublished).

The inventions in the above-mentioned applications filed are made under the conviction that $Fe^{2+}$ can be formed by allowing the Mn—Zn ferrite to contain Ti and/or Sn even when the Mn—Zn ferrite is sintered in the air or in an atmosphere containing some amount of oxygen, which is derived from the findings that iron components in the Mn—Zn ferrite exist as $Fe^{3+}$ and $Fe^{2+}$ and that Ti and Sn receive electrons from this $Fe^{3+}$ to form $Fe^{2+}$. Further, in the inventions of the above-mentioned filed applications, the content of $TiO_2$ and/or $SnO_2$ in the basic component composition is limited to 0.1 to 8.0 mol % for controlling the amount of $Fe^{2+}$ formed so that the coexistence ratio of $Fe^{3+}$ to $Fe^{2+}$ is optimized to offset positive and negative crystal magnetic anisotropy, whereby an excellent soft magnetism can be obtained. Further, since a number of $Ti^{4+}$ and $Sn^{4+}$ ions which have stable valences exist under the conditions, even if $Fe_2O_3$ content is limited to a low level, an exchange of electrons between $Fe^{3+}$ and $Fe^{2+}$ is substantially blocked. Thus, an electrical resistance remarkably higher (about $10^3$ times) than conventionally can be obtained.

The present inventors have made the invention by finding out in a series of researches related to the Mn—Zn ferrite that the initial permeability, particularly the initial permeability in a high frequency region is further enhanced by allowing one or more from CoO, NiO and MgO to be contained in a suitable amount as additive to a basic component composition in which $Fe_2O_3$ content is limited to 50.0 mol % or less and in which $TiO_2$ and/or $SnO_2$ is contained in a suitable amount as described above.

That is, a Mn—Zn ferrite according to one aspect of the present invention to attain the above-mentioned objects is characterized in that the basic component composition contains 44.0 to 50.0 mol % $Fe_2O_3$, 4.0 to 26.5 mol % ZnO, 0.1 to 8.0 mol % one or two from $TiO_2$ and $SnO_2$ and the remainder consisting of MnO, and further contains 0.01 to 2.00 mass % one or more from CuO, NiO and MgO as additive.

Further, a Mn—Zn ferrite according to another aspect of the present invention is characterized in that the basic component composition contains 44.0 to 50.0 mol % $Fe_2O_3$, 4.0 to 26.5 mol % ZnO, 0.1 to 8.0 mol % one or two from $TiO_2$ and $SnO_2$, 0.1 to 16.0 mol % CuO and the remainder consisting of MnO, and further contains 0.01 to 2.00 mass % one or more from CoO, NiO and MgO as additive.

The Mn—Zn ferrite according to the present invention is characterized in that $Fe_2O_3$ content is limited to 50.0 mol % or less as described above. However, since too little $Fe_2O_3$ content leads to reduction in the saturation magnetization or initial permeability, at least 44.0 mol % $Fe_2O_3$ is adapted to be contained.

ZnO affects the Curie temperature and saturation magnetization. If ZnO is contained in a significant amount, the Curie temperature is lowered, resulting in practical problems. On the other hand, if ZnO is contained in too small an amount, the saturation magnetization is reduced. Thus, ZnO content is preferably controlled to the above-mentioned range of 4.0 to 26.5 mol %.

CuO has an effect to enable the Mn—Zn ferrite to be sintered at a low temperature. However, if the CuO content is too small, the effect is small. On the other hand, if the CuO content is too large, the initial permeability is reduced. Thus, CuO content is preferably controlled to the above-mentioned range of 0.1 to 16.0 mol %.

Since all of CoO, NiO and MgO are metal oxides having magnetism, they are solid-dissolved in the spinel lattices of the Mn—Zn ferrite and impart good influences to the magneto-striction, crystal magnetic anisotropy, and induced magnetic anisotropy, respectively. However, if their content is small, the effect is small. On the other hand, if their content is too large, the reduction of the initial permeability occurs. Thus, CoO, NiO or MgO content is preferably controlled to the above-mentioned range of 0.01–2.00 mass %.

Since in the Mn—Zn ferrite according to the present invention, $Fe_2O_3$ content is limited to 50 mol % or less as described above, even if the Mn—Zn ferrite is sintered in the air or in an atmosphere containing some amount of oxygen, densification is sufficiently attained and desired soft magnetism can be obtained.

That is, a production process according to one aspect of the present invention to attain the above-mentioned objects is characterized in that mixed powder whose components are adjusted so as to compose the above-mentioned Mn—Zn ferrite is pressed, then sintered and cooled in the air.

Further, a production process according to another aspect of the present invention is characterized in that mixed powder whose components are adjusted so as to compose the above-mentioned Mn—Zn ferrite is pressed, then sintered and cooled in an atmosphere with the partial pressure of oxygen obtained by using an optional value in a range of 6 to 21 as the constant b in the aforementioned expression (1).

In this case, when a value larger than 21 is selected as the constant b in the expression (1), the resulting atmosphere becomes substantially the same as the air. Thus, it makes no sense to define the partial pressure of oxygen. Further, if this constant b is smaller than 6, electrical resistance becomes too low, whereby initial permeability at a high frequency is deteriorated.

DETAILED DESCRIPTION OF THE INVENTION

In the production of a Mn—Zn ferrite, raw material powders of $Fe_2O_3$, ZnO, $TiO_2$ and/or $SnO_2$, CuO, MnO and the like used as main components are previously weighed to match the above defined basic component composition, and are mixed. Then, the mixed powder is calcined and finely milled as required. The calcining temperature is slightly different depending upon the target composition, and an appropriate temperature can be selected within a range of 800 to 1000° C. A general-purpose ball mill can be used for fine milling of the mixed powder. Further, powder of CoO, NiO or MgO is added to the fine mixed powder in a prescribed amount (0.01 to 2.00 mass %) as the additive and mixed to obtain mixed powder having the target composition. Then, the mixed powder is granulated and pressed in accordance with a usual ferrite production process, and sintered at 900 to 1400° C. Incidentally, a process of adding a binder such as polyvinyl alcohol, polyacrylamide, methyl cellulose, polyethylene oxide, glycerin, or the like can be used for the granulation, and a process of applying pressure of, for example, 80 MPa or more can be used for the pressing.

The above-mentioned sintering and cooling after the sintering can be conducted in the air or in an atmosphere with the partial pressure of oxygen defined based on the aforementioned expression (1) where the constant b is within a range of 6 to 21. However, when they are conducted in an atmosphere containing oxygen, it is desirable to control the oxygen by allowing an inert gas such as nitrogen or the like to flow into a sintering furnace. In this case, an optional value in a wide range of 6 to 21 can be selected as the constant b given in the expression (1). Therefore, the control of the partial pressure of oxygen can be made easily.

Since the Mn—Zn ferrite thus obtained contains $TiO_2$ and/or $SnO_2$ as main components while containing 50 mol % or less $Fe_2O_3$, electrical resistance is remarkably increased (about $10^3$ times) as compared to conventional Mn—Zn ferrite.

Further, generally, the limit of the initial permeability $\mu$ in soft magnetic ferrite is inversely proportional to a frequency f (MHz) at which the ferrite is used, and is estimated with a value obtained by the expression (2) given below, but since the Mn—Zn ferrite according to the present invention contains CoO, NiO or MgO as additive in a prescribed amount, an initial permeability $\mu$ of about 2000 at 1 MHz or about 200 at 10 MHz can be obtained as estimated. Thus, the present Mn—Zn ferrite can be ideal for use in a magnetic core material and an electromagnetic wave absorbing material for a high frequency exceeding 1 MHz.

$$\mu=K/f(K=1500 \text{ to } 2000) \tag{2}$$

EXAMPLES

Example 1

A mixture consisting of 42.0 to 52.0 mol % $Fe_2O_3$, 0 to 10.0 mol % $TiO_2$ or $SnO_2$ and the remainder shared with MnO and ZnO at a molar ratio of 26:25, which was made by mixing respective raw material powders, was calcined in the air at 900° C. for 2 hours and milled with a ball mill for 20 hours to obtain mixed powder. Then, while the component of this mixed powder was adjusted so as to conform to the previously defined composition, CoO, NiO or MgO was added as additive in a prescribed amount to some of the mixed powder, which was further mixed with a ball mill for 1 hour. Then, this mixed powder with addition of polyvinyl alcohol was granulated and pressed at a pressure of 80 MPa into toroidal cores (green compacts) each having an outer diameter of 18 mm, an inner diameter of 10 mm and a height of 4 mm. The green compacts were put into a sintering furnace, then sintered at 1200° C. for 3 hours and immediately cooled in an atmosphere adjusted by allowing nitrogen to flow thereinto so as to have such a partial pressure of oxygen as obtained with the constant b in the expression (1) set to 8, and samples 1-1 to 1-9 shown in Table 1 were obtained.

On the respective samples 1-1 to 1-9 thus obtained, final component composition was checked by the fluorescent X-ray analysis and electrical resistance was measured, and also initial permeability was measured at 0.1 MHz, 1 MHz, and 10 MHz. Their results are shown together in Table 1.

Example 2

A mixture consisting of 47.0 mol % $Fe_2O_3$, 2.0 mol % $TiO_2$ or $SnO_2$, 0 to 20.0 mol % CuO and the remainder shared with MnO and ZnO at a molar ratio of 26:25, which was made by mixing respective raw material powders, was calcined in the air at 900° C. for 2 hours and milled with a ball mill for 20 hours to obtain mixed powder. Then, while the component of this mixed powder was adjusted so as to conform to the previously defined composition, the mixed powder with addition of 0.50 mass % CoO, NiO or MgO as additive was further mixed with a ball mill for 1 hour. Then,

TABLE 1

| Sample number | Classification | Basic component composition (mol %) | | | | | Additive (mass %) | Electrical resistance [Ωm] | Initial permeability | | |
|---|---|---|---|---|---|---|---|---|---|---|---|
| | | $Fe_2O_3$ | MnO | ZnO | $TiO_2$ | $SnO_2$ | | | 0.1 MHz | 1 MHz | 10 MHz |
| 1-1 | Comparative example | 52.0 | 24.5 | 23.5 | — | — | — | 0.16 | 3880 | 740 | 1 |
| 1-2 | Comparative example | 47.0 | 27.0 | 26.0 | — | — | — | 290 | 3960 | 940 | 70 |
| 1-3 | Present invention | 47.0 | 26.0 | 25.0 | — | 2.0 | 0.01 (CoO) | 300 | 6170 | 2010 | 220 |
| 1-4 | Present invention | 47.0 | 26.0 | 25.0 | 5.0 | — | 2.00 (MgO) | 380 | 6730 | 2000 | 230 |
| 1-5 | Comparative example | 47.0 | 26.0 | 25.0 | 2.0 | — | 3.00 (CoO) | 410 | 3320 | 1150 | 150 |
| 1-6 | Present invention | 44.0 | 27.5 | 26.5 | — | 8.0 | 0.50 (NiO) | 360 | 6600 | 2080 | 210 |
| 1-7 | Comparative example | 42.0 | 28.5 | 27.5 | 2.0 | — | 0.50 (CoO) | 390 | 3720 | 1280 | 140 |
| 1-8 | Present invention | 50.0 | 25.4 | 24.5 | 0.1 | — | 0.01 (CoO) | 200 | 6720 | 2020 | 200 |
| 1-9 | Comparative example | 47.0 | 21.9 | 21.1 | — | 10.0 | 0.01 (CoO) | 440 | 3840 | 1190 | 130 |

As apparent from the results shown in Table 1, all samples 1-2 to 1-9 each having 50.0 mol % or less $Fe_2O_3$ have remarkably high electrical resistances as compared to comparative sample 1-1 having $Fe_2O_3$ exceeding 50.0 mol %. Further, among samples each having 50.0 mol % or less $Fe_2O_3$, samples 1-3, 1-4, 1-6 and 1-8 of the present invention, each containing 44.0 to 50.0 mol % $Fe_2O_3$ and 0.1 to 8.0 mol % $TiO_2$ or $SnO_2$ as basic component composition and also containing 0.01 to 2.00 mass % CoO, NiO, or MgO as additive, could obtain a remarkably high initial permeability of 2000 or more at 1 MHz, and 200 or more even at 10 MHz. On the other hand, the initial permeability of comparative sample 1-1 is 1 at a frequency of 10 MHz, which indicates properties of soft magnetic material are totally lost.

this mixed powder with addition of polyvinyl alcohol was granulated, and pressed at a pressure of 80 MPa into toroidal cores (green compacts) each having an outer diameter of 18 mm, an inner diameter of 10 mm and a height of 4 mm. The green compacts were put into a sintering furnace, then sintered at 900 to 1200° C. for 3 hours and immediately cooled in an atmosphere adjusted by allowing nitrogen to flow thereinto so as to have such an partial pressure of oxygen as obtained with the constant b in the expression (1) set to 8, and samples 2-1 to 2-4 shown in Table 2 were obtained.

On the respective samples 2-1 to 2-4 thus obtained, final component composition was checked by the fluorescent X-ray analysis, and also initial permeability was measured at 1 MHz. Their results are shown together in Table 2.

TABLE 2

| Sample number | Classification | Basic component composition (mol %) | | | | | | Additive (mass %) | Initial permeability at each sintering temperature | | |
|---|---|---|---|---|---|---|---|---|---|---|---|
| | | $Fe_2O_3$ | MnO | ZnO | $TiO_2$ | $SnO_2$ | CuO | | 1200° C. | 1050° C. | 900° C. |
| 2-1 | Present invention | 47.0 | 26.0 | 25.0 | 2.0 | — | — | 0.50 (CoO) | 2120 | 1530 | 820 |
| 2-2 | Present invention | 47.0 | 22.0 | 21.0 | — | 2.0 | 8.0 | 0.50 (NiO) | 1590 | 2150 | 1610 |
| 2-3 | Present invention | 47.0 | 17.8 | 17.2 | 2.0 | — | 16.0 | 0.50 (MgO) | 1160 | 1740 | 2030 |
| 2-4 | Comparative example | 47.0 | 15.8 | 15.2 | 2.0 | — | 20.0 | 0.50 (CoO) | 560 | 980 | 1070 |

As apparent from the results shown in Table 2, in the case of sample 2-1 (of the present invention) containing no CuO, a sintering temperature must be set at as high as 1200° C. to obtain a high initial permeability of 2000 or more. However, in the case of samples 2-2 and 2-3 (of the present invention)

On the respective samples 3-1 to 3-8 thus obtained, final composition was checked by the fluorescent X ray analysis and electrical resistance was measured, and also initial permeability was measured at 0.1 MHz, 1 MHz, and 10 MHz. Their results are shown together in Table 3.

TABLE 3

| Sample number | Classification | Basic component composition (mol %) | | | | | | Additive (mass %) | Constant b | Electrical resistance [Ωm] | Initial permeability | | |
|---|---|---|---|---|---|---|---|---|---|---|---|---|---|
| | | $Fe_2O_3$ | MnO | ZnO | $TiO_2$ | $SnO_2$ | CuO | | | | 0.1 MHz | 1 MHz | 10 MHz |
| 3-1 | Comparative example | 47.0 | 26.0 | 25.0 | 2.0 | — | — | 0.50 (CoO) | 5.5 | 80 | 5820 | 940 | 80 |
| 3-2 | Present invention | 47.0 | 26.0 | 25.0 | 2.0 | — | — | 0.50 (CoO) | 6.0 | 230 | 6930 | 2010 | 200 |
| 3-3 | Present invention | 47.0 | 26.0 | 25.0 | — | 2.0 | — | 0.50 (CoO) | 8.0 | 480 | 6660 | 2060 | 210 |
| 3-4 | Present invention | 47.0 | 26.0 | 25.0 | 2.0 | — | — | 0.50 (CoO) | 10.0 | 710 | 5230 | 2090 | 230 |
| 3-5 | Present invention | 47.0 | 21.9 | 20.0 | — | 2.0 | 8.0 | 0.50 (NiO) | 16.0 | 680 | 3890 | 2140 | 220 |
| 3-6 | Present invention | 47.0 | 26.0 | 25.0 | 2.0 | — | — | 0.50 (CoO) | 21.0 | 970 | 3340 | 2230 | 230 |
| 3-7 | Present invention | 47.0 | 26.0 | 25.0 | — | 2.0 | — | 0.50 (CoO) | in the air | 2380 | 2170 | 2480 | 240 |
| 3-8 | Present invention | 47.0 | 21.9 | 20.1 | 2.0 | — | 8.0 | 0.50 (MgO) | in the air | 2410 | 2410 | 2230 | 240 | containing a suitable amount of CuO, a high initial permeability of 2000 or more could be obtained even when they were sintered at a temperature lower than 1200° C. On the other hand, in the case of sample 2-4 (comparative sample) containing a large amount (20.0 mol %) of CuO, the initial permeability was significantly lowered when it was subjected to sintering at a high temperature of 1200° C. Further, even when sintering was carried out at a temperature lower than 1200° C., a high initial permeability exceeding 2000 could not be obtained. Thus, it has been found that a suitable amount of CuO content works effectively for lowering the optimum sintering temperature and enhancing the initial permeability in a high frequency region.

Example 3

A mixture consisting of 47.0 mol % $Fe_2O_3$, 2.0 mol % $TiO_2$ or $SnO_2$, 0 to 8.0 mol % CuO and the remainder shared with MnO and ZnO at a molar ratio of 26:25, which was made by mixing respective raw material powders, was calcined in the air at 900° C. for 2 hours and milled with a ball mill for 20 hours to obtain mixed powder. Then, while the component of this mixed powder was adjusted so as to have the previously defined composition, the mixed powder with addition of 0.50 mass % CoO, NiO or MgO as additive was further mixed with a ball mill for 1 hour. Then, this mixed powder with addition of polyvinyl alcohol was granulated and pressed at a pressure of 80 MPa into toroidal cores (green compacts) each having an outer diameter of 18 mm, an inner diameter of 10 mm and a height of 4 mm. The green compacts were put into a sintering furnace, sintered at 1200° C. or 1050° C. (1050° C. only for the green compacts containing CuO) for 3 hours and immediately cooled in the air or in an atmosphere adjusted by allowing nitrogen to flow thereinto so as to have such an partial pressure of oxygen as obtained with the constant b in the expression (1) changed variously within a range of 5.5 to 21, and samples 3-1 to 3-8 shown in Table 3 were obtained.

As apparent from the results shown in Table 3, samples 3-2 to 3-6 of the present invention which were sintered in an atmosphere with the partial pressure of oxygen obtained by the expression (1) where the constant b is defined as 6 or more, and the samples 3-7 and 3-8 of the present invention which were sintered in the air both have a high electrical resistance. In accordance with this, the initial permeabilities at high frequencies of 1 MHz and 10 MHz are also increased. Among them, samples 3-7 and 3-8 of the present invention which were sintered in the air have a high electrical resistance and a high initial permeability in a high frequency region as compared to the samples which were sintered in different atmospheres. On the other hand, in comparative sample 3-1 which was sintered in an atmosphere with the partial pressure of oxygen obtained when the constant b is defined as 5.5, though the initial permeabilities at 0.1 MHz is high, the initial permeabilities at high frequencies of 1 MHz and 10 MHz are the lowest.

Meanwhile, in the above-mentioned examples, cooling after sintering is carried out in an adjusted atmosphere up to at least 300° C. other than the case where sintering is carried out in the air. It is generally well known that sintered powders are not influenced by an atmosphere at a temperature below 300° C. Thus, it does not make sense to adjust the atmosphere at a temperature below 300° C.

According to the Mn—Zn ferrite and the production process thereof described above in the present invention, with a unique component composition in which $Fe_2O_3$ content is limited to 50 mol % or less by allowing $TiO_2$ or $SnO_2$ to be contained and in which CoO, NiO or MgO is contained as additive, an excellent initial permeability can be obtained in a wide frequency band from a comparatively low frequency region to a high frequency region of 10 MHz regardless of the Mn—Zn ferrite sintered in the air or in an atmosphere containing some amount of oxygen.

Further, according to the present invention, the troublesome atmosphere control is not necessary in sintering. Particularly, when the Mn—Zn ferrite contains CuO, it can be sintered at a low temperature and the cost for sintering is

What is claimed is:

1. A Mn—Zn ferrite wherein a basic component composition contains 44.0 to less than 49 mol % $Fe_2O_3$, 4.0 to 26.5 mol % ZnO, 0.1 to 8.0 mol % of at least one from $TiO_2$ and $SnO_2$ and the remainder consisting of MnO, and further contains 0.01 to 2.00 mass % of at least one from CoO, NiO and MgO as additive.

2. A Mn—Zn ferrite wherein a basic component composition contains 44.0 to less than 49 mol % $Fe_2O_3$, 4.0 to 26.5 mol % ZnO, 0.1 to 8.0 mol % of at least one from $TiO_2$ and $SnO_2$, 0.1 to 16.0 mol % CuO and the remainder consisting of MnO, and further contains 0.01 to 2.00 mass % of at least one from CoO, NiO and MgO as additive.

3. A production process of the Mn—Zn ferrite wherein mixed powder whose components are adjusted so as to have the composition of the Mn—Zn ferrite according to claim 1 is pressed, then sintered and immediately cooled in the air.

4. A production process of the Mn—Zn ferrite wherein mixed powder whose components are adjusted so as to have the composition of the Mn—Zn ferrite according to claim 1 is pressed, then sintered and immediately cooled down to 300° C. or lower in an atmosphere with a partial pressure of oxygen defined by the following expression:

$$\log PO_2 = -14540/(T+273) + b$$

where T: Temperature (°C.), $PO_2$: relative partial pressure of oxygen, wherein $PO_2 = P'O_2/P_{total}$, $P'O_2$ is the absolute partial pressure of oxygen (Pa), and $P_{total}$ is the absolute total pressure (Pa), and b: a constant selected from a range of 6 to 21.

5. A production process of the Mn—Zn ferrite wherein mixed powder whose components are adjusted so as to have the composition of the Mn—Zn ferrite according to claim 2 is pressed, then sintered and immediately cooled in the air.

6. A production process of the Mn—Zn ferrite wherein mixed powder whose components are adjusted so as to have the composition of the Mn—Zn ferrite according to claim 2 is pressed, then sintered and immediately cooled down to 300° C. or lower in an atmosphere with a partial pressure of oxygen defined by the following expression:

$$\log PO_2 = -14540/(T+273) + b$$

where T: Temperature (°C.), $PO_2$: relative partial pressure of oxygen, wherein $PO_2$ is the absolute partial pressure of oxygen (Pa), and $P_{total}$ is the absolute total pressure (Pa), and b: a constant selected from a range of 6 to 21.

7. A Mn—Zn ferrite consisting essentially of a basic composition containing 44.0 to less than 49.0 mol % $Fe_2O_3$, 4.0 to 26.5 mol % of ZnO, 0.1 to 8.0 mol % of at least one from $TiO_2$ and $SnO_2$ and the remainder consisting of MnO, and further 0.01 to 2.00 mass % of at least one from CoO, NiO and MgO as additive.

8. A Mn—Zn ferrite consisting essentially of a basic composition containing 44.0 to less than 49.0 mol % $Fe_2O_3$, 4.0 to 26.5 mol % of ZnO, 0.1 to 8.0 mol % of at least one from $TiO_2$ and $SnO_2$, 0.1 to 16.0 mol % CuO and the remainder consisting of MnO, and further 0.01 to 2.00 mass % of at least one from CoO, NiO and MgO as additive.

9. A Mn—Zn ferrite according to claim 1, wherein the basic component composition contains 44.0 to 47.0 mol % $Fe_2O_3$.

10. A Mn—Zn ferrite according to claim 2, wherein the basic component composition contains 44.0 to 47.0 mol % $Fe_2O_3$.

11. A Mn—Zn ferrite according to claim 7, wherein the basic component composition contains 44.0 to 47.0 mol % $Fe_2O_3$.

12. A Mn—Zn ferrite according to claim 8, wherein the basic component composition contains 44.0 to 47.0 mol % $Fe_2O_3$.

* * * * *